US012231376B2

(12) United States Patent
Liu et al.

(10) Patent No.: US 12,231,376 B2
(45) Date of Patent: Feb. 18, 2025

(54) TIME DIVISION DUPLEX PATTERN CONFIGURATION FOR CELLULAR NETWORKS

(71) Applicant: Dell Products, L.P., Round Rock, TX (US)

(72) Inventors: Jia Liu, Newmarket (CA); Ramy Atawia, Kanata (CA); Chris Wallace, Stittsville (CA)

(73) Assignee: Dell Products, L.P., Round Rock, TX (US)

( * ) Notice: Subject to any disclaimer, the term of this patent is extended or adjusted under 35 U.S.C. 154(b) by 390 days.

(21) Appl. No.: 17/658,777

(22) Filed: Apr. 11, 2022

(65) Prior Publication Data
US 2023/0327844 A1    Oct. 12, 2023

(51) Int. Cl.
*H04L 5/14*     (2006.01)
*H04W 72/0446*  (2023.01)
*H04W 72/1263*  (2023.01)
*H04W 72/542*   (2023.01)

(52) U.S. Cl.
CPC ....... *H04L 5/1469* (2013.01); *H04W 72/0446* (2013.01); *H04W 72/1263* (2013.01); *H04W 72/542* (2023.01)

(58) Field of Classification Search
None
See application file for complete search history.

(56) References Cited

U.S. PATENT DOCUMENTS

| 9,973,934 B2 * | 5/2018 | Hong ............... H04W 72/0446 |
| 12,021,797 B2 * | 6/2024 | Zhang ...................... H04L 5/22 |
| 2011/0096703 A1 * | 4/2011 | Nentwig .............. H04B 7/2643 370/294 |

(Continued)

FOREIGN PATENT DOCUMENTS

| EP | 2 690 919 A1 | 1/2014 |
| EP | 3 319 379 A | 5/2018 |
| WO | 2013/120517 A1 | 8/2013 |

OTHER PUBLICATIONS

International Search Report and Written Opinion received for PCT Application Serial No. PCT/US2022/053274 dated, Mar. 28, 2023, 12 pages.

(Continued)

*Primary Examiner* — Bob A Phunkulh
(74) *Attorney, Agent, or Firm* — Amin, Turocy & Watson, LLP

(57) ABSTRACT

The described technology is generally directed towards time division duplex (TDD) pattern configuration for cellular networks. Example methods can calculate TDD pattern configurations for use in 5G and subsequent generation networks. TDD pattern configurations can be calculated based on traffic demand, which can be estimated based on data channel demands, control channel requirements, user equipment (UE) capabilities, UE radio frequency (RF) conditions, and/or target quality of service (QoS) levels. Time offsets between downlink (DL) and uplink (UL) transmissions can be adjusted to meet service latency requirements and hardware limitations. Cells can opportunistically adopt different TDD patterns according to their individual traffic demands using semi-static and dynamic TDD pattern reconfiguration.

20 Claims, 11 Drawing Sheets

(56) References Cited

U.S. PATENT DOCUMENTS

| | | | | |
|---|---|---|---|---|
| 2014/0056186 A1* | 2/2014 | Gao | ............. | H04B 7/2656 |
| | | | | 370/280 |
| 2015/0365941 A1* | 12/2015 | Liu | ............. | H04L 5/14 |
| | | | | 370/280 |
| 2016/0165591 A1* | 6/2016 | Li | ............. | H04J 3/12 |
| | | | | 370/280 |
| 2016/0249329 A1* | 8/2016 | Au | ............. | H04W 72/0446 |
| 2019/0045397 A1* | 2/2019 | Mueck | ............. | H04W 72/53 |
| 2021/0329473 A1* | 10/2021 | Zhang | ............. | H04W 16/28 |
| 2021/0351832 A1* | 11/2021 | Zhang | ............. | H04L 5/1461 |
| 2021/0351838 A1* | 11/2021 | Zhang | ............. | H04B 7/0695 |
| 2021/0351902 A1* | 11/2021 | Zhang | ............. | H04L 5/0051 |
| 2021/0352510 A1* | 11/2021 | Zhang | ............. | H04L 1/189 |
| 2022/0030555 A1* | 1/2022 | Chae | ............. | H04W 28/26 |
| 2022/0201715 A1* | 6/2022 | Wei | ............. | H04L 5/0051 |
| 2022/0312232 A1* | 9/2022 | Nam | ............. | H04W 24/08 |
| 2022/0377760 A1* | 11/2022 | Sun | ............. | H04W 72/23 |
| 2023/0179390 A1* | 6/2023 | Ibrahim | ............. | H04W 24/08 |
| | | | | 370/278 |
| 2023/0403114 A1* | 12/2023 | Ko | ............. | G01S 5/02 |
| 2024/0129101 A1* | 4/2024 | Yuan | ............. | H04L 5/14 |
| 2024/0214923 A1* | 6/2024 | Abotabl | ............. | H04W 72/04 |

OTHER PUBLICATIONS

"5G; NR; Radio Resource Control (RRC); Protocol specification," Technical Specification, 3GPP TS 38.331 version 15.2.1 Release 15, Jun. 2018, 299 pages.

"5G; NR; Physical layer procedures for control," Technical Specification, 3GPP TS 38.213 version 15.3.0 Release 15, Oct. 2018, 102 pages.

Zhao et al., "Context-aware TDD Configuration and Resource Allocation for Mobile Edge Computing," IEEE Transactions on Communications ( vol. 68, Issue: 2, Feb. 2020), 14 pages.

Esswie et al., "Semi-Static Radio Frame Configuration for URLLC Deployments in 5G Macro TDD Networks," arXiv:2001.05689v1 [eess.SP] Jan. 16, 2020, 6 pages.

"O-RAN Working Group 3 Near-Real-time RAN Intelligent Controller E2 Service Model (E2SM), RAN Control," Technical Specification, ORAN.WG3.E2SM-RC-v01.01.00, 267 pages.

* cited by examiner

TIME DIVISION DUPLEX PATTERN CONFIGURATION FOR CELLULAR NETWORKS

BACKGROUND

Fifth generation (5G) cellular networks have introduced new spectrums to meet the increasing demands of mobile data volume and achieve enhanced user experience. Among those new spectrums, a lot of attention has been put into the 3.5 gigahertz (GHz) and millimeter wave (mmWave) bands since they have wide available bandwidth for 5G. Both the 3.5 GHz and mmWave spectrum utilize Time Division Duplex (TDD) transmission, which means a same frequency band is used for both downlink (DL) and uplink (UL) transmission, and the division of the DL and UL is based on time. Different time slots are used for DL or UL transmission. Compared to Frequency Division Duplexing (FDD), TDD has certain benefits, for example, the UL and DL channel are reciprocal, and resources can be dynamically allocated to DL and UL in order to meet the various types of traffic demands.

The above-described background is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
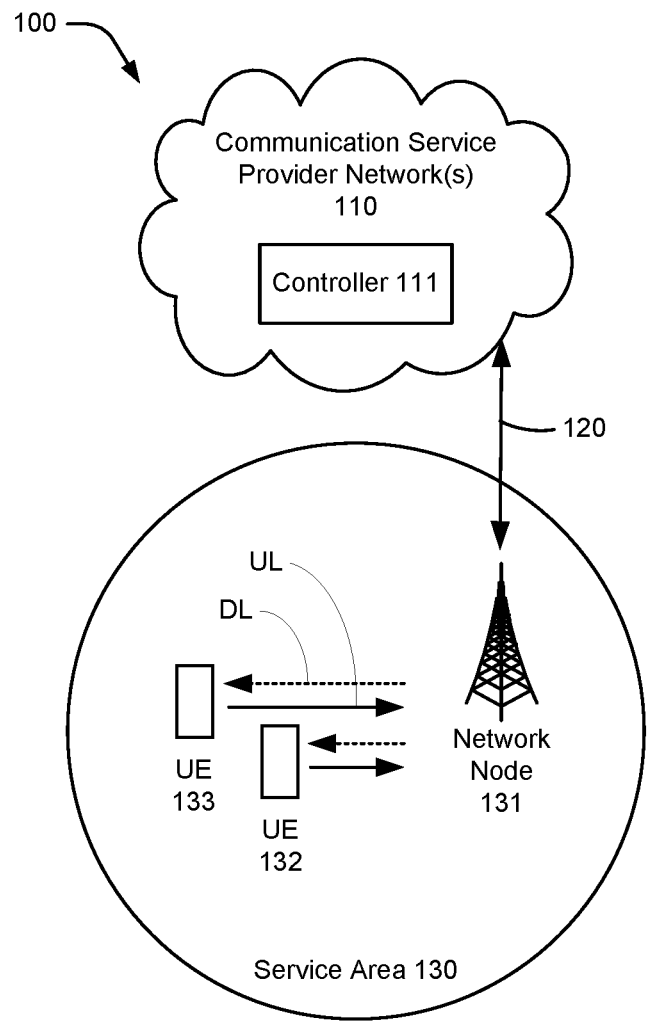
FIG. 1 illustrates an example wireless communication system configured for fast adjustment of RAN parameters, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards time division duplex (TDD) pattern configuration for cellular networks. Example methods can calculate TDD pattern configurations for use in 5G and subsequent generation networks. TDD pattern configurations can be calculated based on traffic demand, which can be estimated based on control channel requirements, user device capabilities and/or target quality of service (QoS) levels. Time offsets between downlink (DL) and uplink (UL) transmissions can be adjusted to meet service latency requirements and hardware limitations. Cells can opportunistically adopt different TDD patterns according to their individual traffic demands using semi-static and dynamic TDD pattern reconfiguration. Further aspects and embodiments of this disclosure are described in detail below.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

FIG. 1 illustrates an example wireless communication system 100, in accordance with various aspects and embodiments of the subject disclosure. The example wireless communication system 100 comprises communication service provider network(s) 110, a network node 131, and user equipment (UEs) 132, 133. The communication service provider network(s) 110 include a controller 111. A backhaul link 120 connects the communication service provider network(s) 110 and the network node 131. The network node 131 can communicate with UEs 132, 133 within its service area 130. The dashed arrow lines from the network node 131 to the UEs 132, 133 represent downlink (DL) communications to the UEs 132, 133. The solid arrow lines from the UEs 132, 133 to the network node 131 represent uplink (UL) communications.

In some embodiments, techniques disclosed herein can be used to determine a TDD pattern for the DL and UL communications between UEs 132, 133 and the network node 131. For example, the controller 111 can apply techniques disclosed herein to generate a TDD pattern for use by the network node 131. The communication service provider network(s) 110 can provide the TDD pattern to the network node 131, and the network node 131 can apply the generated TDD pattern. The controller 111 can also generate TDD patterns for other network nodes, e.g., neighbor nodes of the network node 131 (not illustrated in FIG. 1).

In some embodiments, processes to effectively calculate, decide, and configure optimal TDD patterns for 5G systems, such as communication system 100, are disclosed. With optimized TDD patterns, the system 100 performance can be improved, and UEs 132, 133 can benefit from enhanced service experience. The controller 111 can implement the TDD optimization methods disclosed herein. In addition, radio access network (RAN) nodes such as network node 131, or other nodes of a RAN can be modified to provide the controller 111 with network data in order to configure TDD patterns for use by UEs 132, 133 as well as by other RAN components.

In general, with reference to FIG. 1, the non-limiting term "user equipment" can refer to any type of device that can communicate with network node 131 in a cellular or mobile communication system 100. UEs 132, 133 can have one or more antenna panels having vertical and horizontal elements. Examples of UEs 132, 133 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 132, 133 can also comprise IOT devices that communicate wirelessly.

In various embodiments, system 100 comprises communication service provider network(s) 110 serviced by one or more wireless communication network providers. Communication service provider network(s) 110 can comprise a "core network". In example embodiments, UEs 132, 133 can be communicatively coupled to the communication service provider network(s) 110 via a network node 131. The network node 131 can communicate with UEs 132, 133, thus providing connectivity between the UEs 132, 133 and the wider cellular network. The UEs 132, 133 can send transmission type recommendation data to the network node 131. The transmission type recommendation data can comprise a recommendation to transmit data via a closed loop multiple input multiple output (MIMO) mode and/or a rank-1 precoder mode.

Network node 131 can have a cabinet and other protected enclosures, computing devices, an antenna mast, and multiple antennas for performing various transmission operations (e.g., MIMO operations) and for directing/steering signal beams. Network node 131 can comprise one or more base station devices which implement features of the network node. Network nodes can serve several cells, depending on the configuration and type of antenna. In example embodiments, UEs 132, 133 can send and/or receive communication data via wireless links to the network node 131.

Communication service provider networks 110 can facilitate providing wireless communication services to UEs 132, 133 via the network node 131 and/or various additional network devices (not shown) included in the one or more communication service provider networks 110. The one or more communication service provider networks 110 can comprise various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 100 can be or comprise a large-scale wireless communication network that spans various geographic areas. According to this implementation, the one or more communication service provider networks 110 can be or comprise the wireless communication network and/or various additional devices and components of the wireless communication network (e.g., additional network devices and cell, additional UEs, network server devices, etc.).

The network node 131 can be connected to the one or more communication service provider networks 110 via one or more backhaul links 120. The one or more backhaul links 120 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 120 can also comprise wireless link components, such as but not limited to, line-of-sight (LOS) or non-LOS links which can comprise terrestrial air-interfaces or deep space links (e.g., satellite communication links for navigation). Backhaul links 120 can be implemented via a "transport network" in some embodiments. In another embodiment, network node 131 can be part of an integrated access and backhaul network. This may allow easier deployment of a dense network of self-backhauled 5G cells in a more integrated manner by building upon many of the control and data channels/procedures defined for providing access to UEs 132, 133.

Wireless communication system 100 can employ various cellular systems, technologies, and modulation modes to facilitate wireless radio communications between devices (e.g., the UEs 132, 133 and the network node 131). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 100 can operate in accordance with any 5G, next generation communication technology, or existing communication technologies, various examples of which are listed supra. In this regard, various features and functionalities of system 100 are applicable where the devices (e.g., the UEs 132, 133 and the network node 131) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multicell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example, several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

Figure 2:
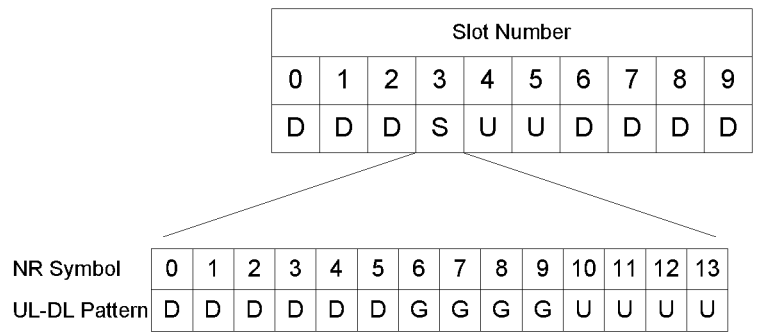
FIG. 2 illustrates an example TDD pattern, in accordance with various aspects and embodiments of the subject disclosure.

FIG. 2 illustrates an example TDD pattern, in accordance with various aspects and embodiments of the subject disclosure. In a TDD-based system, the spectrum resources in each time slot can be configured either as downlink (D), uplink (U) or special (S). The special slot contains downlink, uplink and some muted symbols for a guard period (G). The 3GPP has provided the flexibility of configuring the TDD pattern in 5G systems, where the slot configuration can be sent to a UE either in a semi-static approach, via radio resource control (RRC) messages, or in a dynamic approach, via downlink control information (DCI) for each slot. In FIG. 1, the example pattern is DDDSUUDDDD, where D denotes downlink slots, U denotes uplink slots, and S denotes the special slot with 6 downlink symbols, 4 guard symbols, and 4 uplink symbols.

Unlike FDD-based systems, TDD is more suitable for asymmetric traffic scenarios where the amount of downlink and uplink traffic is not the same, and different ratios of slot types can be used. A challenge, however, is the lack of concurrent DL and UL transmission, which can increase the total end to end delay of data transmission, particularly if the ratio and time offset between the downlink and uplink slots is not optimized.

Prior approaches for determining TDD patterns have been hampered by several problems, including estimating DL and UL traffic demand based only on volume of DL and UL data, configuring the pattern/sequence of UL and DL slots based only on the ratio of DL to UL slots, and using a single pattern throughout an entire network.

Some embodiments of this disclosure can consider control channel data, in addition to volumes of DL and UL data, to determine the amount of data need to be transmitted in DL and UL. In practical mobile networks like the 3GPP based 5G and LTE systems, control channels are mandatory for DL and UL data transmission. For example, physical downlink control channel (PDCCH) resources are required for sending the resource allocations to a UE for both DL and UL data transmission. Physical uplink control channel (PUCCH) resources are required for, e.g., scheduling request (SR), and channel state information (CSI) report data. Those control channel resources have dependency on traffic volume. Therefore, considering only the data volume does not reflect the real demand of spectrum resource requirements for DL and UL. The corresponding control channel resources associated with the DL and UL traffic in each cell can be also incorporated into solutions according to this disclosure, to calculate the overall DL and UL resource demands.

Figure 3:
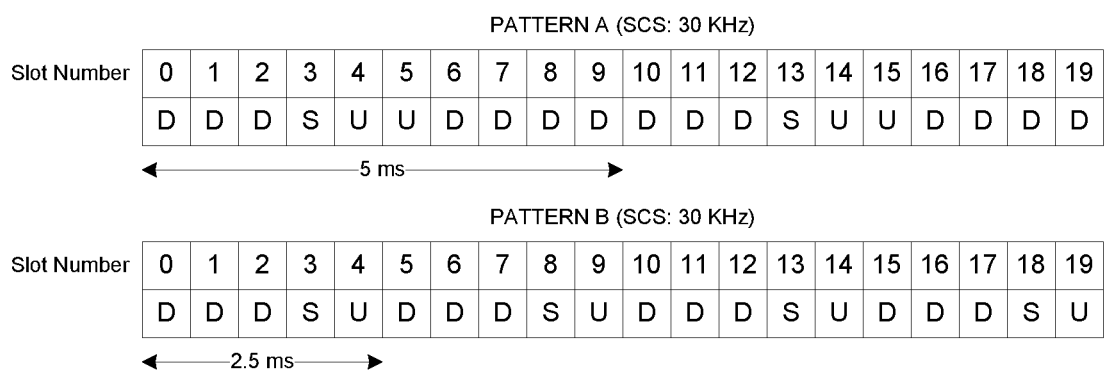
FIG. 3 illustrates example TDD patterns with different DL to UL offsets, in accordance with various aspects and embodiments of the subject disclosure.

FIG. 3 illustrates example TDD patterns with different DL to UL offsets, in accordance with various aspects and embodiments of the subject disclosure. Some embodiments of this disclosure can consider offsets associated with different TDD patterns in connection with TDD pattern selection. As illustrated in FIG. 3, the time offset between the DL and UL slots can be considered to further optimize TDD patterns. Different TDD patterns can have different DL to UL offsets. For example, pattern A: DDDSUUDDDD where S (6:4:4) has a different offset than pattern B: DDDSU where S (10:2:2). The DL to UL symbol level resource ratio of these two TDD patterns are the same, which is 3.25. However, with subcarrier spacing (SCS) of 30 KHz, for TDD pattern A, the DL to UL offset is up to 5 ms. For TDD pattern B, the DL to UL offset is up to 2.5 ms. With the different DL to UL offsets, the pattern A will have much higher user plane latency compared to pattern B. Therefore, when selecting an optimized TDD pattern, considering only the DL to UL traffic ratio is not enough. The latency targets of different types of services must be also considered. This is of particular importance in 5G networks, since one of the differentiators of 5G is to provide lower latency compared to LTE.

Furthermore, traffic can have different types of priority, which is reflected as the quality of service (QoS) in 3GPP based systems. TDD pattern selection without consideration of traffic priority may not be able to meet the requirements of different types of services and/or achieve optimized network performance. For example, if UL traffic is for mission critical services and has higher priority than the DL traffic, the TDD pattern selection should preferably ensure enough UL resources can be allocated, even if the UL to DL traffic ratio is very low. In this case, failure to meet the UL resource requirement of the higher priority UL traffic could violate target QoS for the high priority service. Also, if limited UL resources are allocated by a TDD pattern selector, since the scheduler will prioritize the UL traffic with higher priority, the other UL traffic could be lagged and the overall network performance can be impacted.

Some embodiments of this disclosure can allow different TDD patterns for different cells of a group or cluster of cells. This stands in contrast with existing approaches that assume that neighboring cells in a specific cluster must follow a same TDD pattern to avoid cross-link interference (CLI). Such unified patterns are suboptimal when different cells are experiencing different amounts of traffic in DL and UL. Although the CLI avoidance/mitigation is a consideration for selecting the TDD pattern, there are scenarios in which ununified TDD patterns can be used for better performance. For example, if the CLI is not dominant between neighboring cells due to UEs being close to the serving cell center or due to some cells being indoors, then different TDD patterns can be adopted among those cells to achieve optimized system performance. As another example, if different cells have different traffic patterns, dividing a cluster of cells into different sub-groups with different TDD patterns can be evaluated to determine whether a global performance improvement can be achieved. When ununified TDD patterns are used, a centralized controller can be adopted to jointly schedule radio frequency (RF) resources in the cells of the cluster to avoid/mitigate CLI.

Figure 4:
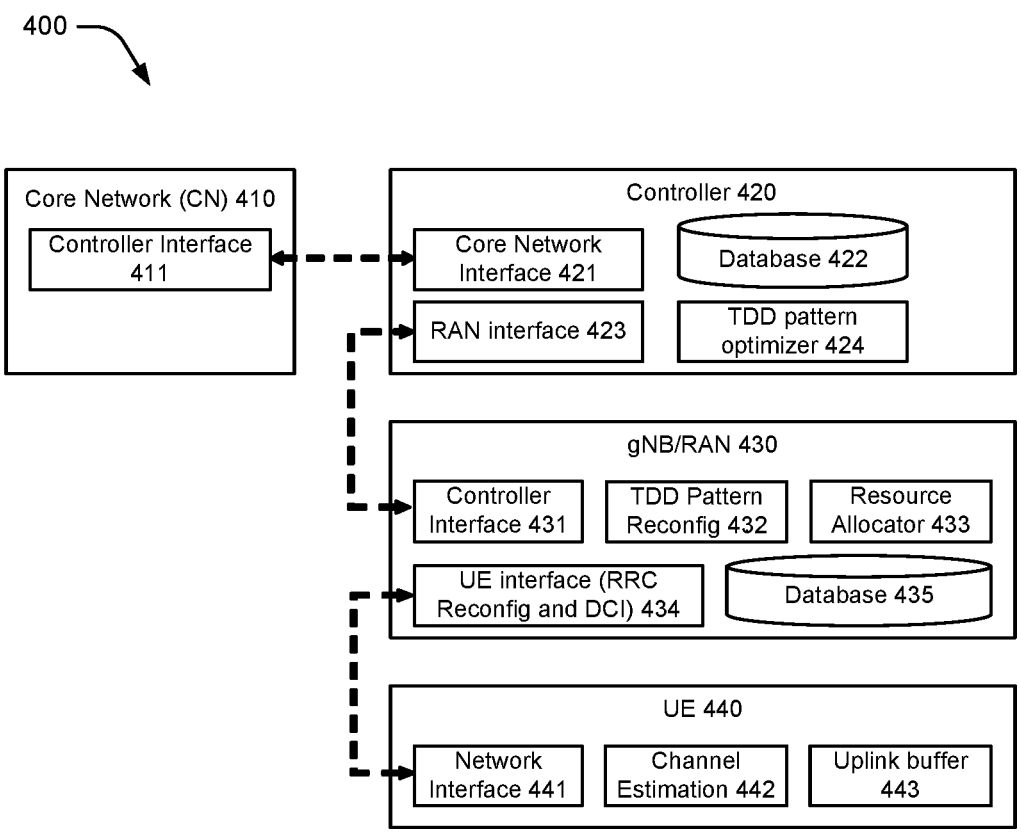
FIG. 4 illustrates an example architecture to control TDD patterns employed by network nodes, in accordance with various aspects and embodiments of the subject disclosure.

FIG. 4 illustrates an example architecture to control TDD patterns employed by network nodes, in accordance with various aspects and embodiments of the subject disclosure. The example architecture 400 includes a core network (CN) 410, a controller 420, a gNB/RAN 430, and a UE 440. In some embodiments the CN 410 and the controller 420 can be implemented via the communication service provider network(s) 110 and the controller 111 introduced in FIG. 1. The gNB/RAN 430 can implement the network node 131 introduced in FIG. 1, and the UE 440 can implement a UE such as UE 132 introduced in FIG. 1.

In embodiments according to FIG. 4, the CN 410 can include a controller interface 411. The controller 420 can include a core network interface 421, a database 422, a RAN interface 423, and a TDD pattern optimizer 424. The gNB/RAN 430 can include a controller interface 431, a TDD pattern reconfig 432, a resource allocator 433, a UE interface (RRC reconfig and DCI) 434, and a database 435. The UE 440 can include a network interface 441, a channel estimation 442, and an uplink buffer 443.

With regard to the controller 420, the core network interface 421 can be configured to allow the controller 420 to collect traffic information from the core network 410. The traffic information can be stored in the database 422, and the controller 420 can use the traffic information to estimate traffic demand. The core network interface 421 can also be used to collect QoS related requirements for UEs, e.g., for UE 440.

The RAN interface 423 can be configured to allow the controller 420 to collect both channel conditions and traffic demand from RAN nodes, e.g., from gNB/RAN 430. Hardware and software capabilities of the RAN nodes and UEs can also be collected. The RAN interface 423 can furthermore send, to the RAN node, optimized TDD patterns generated by TDD pattern optimizer 424. The RAN interface 423 can allow communication with different RAN nodes, which can be co-located or spatially distributed to maximize network coverage.

The controller 420 can use the database 422 to store the network measurements needed for determining optimal TDD patterns. In addition, the controller 420 can store a set of possible TDD patterns that can be evaluated and recommended to the RAN node 430.

The TDD pattern optimizer 424 can comprise a processing entity which hosts the component(s) that compute optimal TDD pattern configurations using collected measurements in the database 422 and over the different interfaces. The TDD pattern optimizer 424 can consider target KPIs, signaling overhead, and future demands while calculating the optimal TDD configurations. An optimal TDD pattern can either be selected from a set of input possible patterns by an operator or created in real-time.

The gNB/RAN node 430 can comprise, e.g., a DU or CU. With regard to the gNB/RAN node 430, the controller interface 431 can be configured to allow the RAN node 430 to communicate with controller 420 to send collected network measurements and receive recommended TDD pattern configurations. The controller interface 431 can be configured to support data collection requests and periodic data reporting from the controller 420.

The database 435 can be configured to store the measurements collected from different UEs, e.g., from UE 440, and different cells that can be reported to the controller 420 based on requests or configured timers. The database 435 can also store the latest TDD patterns recommended by the controller 420, which can be applied directly by the RAN node 430 without further involving the controller 420.

The TDD pattern reconfiguration 432 can be configured to receive TDD pattern configurations from the controller 420 and propagate the TDD pattern configurations to other components in the RAN, via the UE interface 434 and the resource allocator 433. The TDD pattern reconfiguration 432 can furthermore ensure that TDD patterns are provided/applied at the UE 440 at correct times, to the to avoid interruptions of ongoing data transmissions.

The UE interface 434 corresponds to the air-interface that connects the RAN node 430 with the UE 440 based on 3GPP specifications. The UE interface 434 can be used to collect UE 440 related information (demand, channel quality and capabilities) as well as to configure and reconfigure TDD patterns to be applied by the UE 440. The UE interface 434 can communicate with the UE 440 via RRC messages or downlink control information (DCI).

The resource allocator 433 corresponds to the scheduler that can follow configured TDD patterns from the TDD pattern reconfiguration component 432.

With regard to the UE 440, the UE 440 can comprise 3GPP compliant user equipment which employs channel estimation 442, uplink buffer 443, and network interface 441 according to applicable standards. Channel estimation 442 can be based on channel state information messages received from the gNB 430 and reported on channel state information report (CSI-reports) communicated over PUCCH or PUSCH. Uplink buffer 443 can store data buffered at the UE 440 to estimate the UL traffic demand. This data can be sent to the gNB 430 as part of a buffer status report (BSR). Network interface 441 can comprise a 3GPP compliant air-interface that connects the UE 440 with the RAN 430. The UE 440 can receive TDD pattern reconfigurations from this interface via RRC messages or DCI. The UE 440 can also send channel estimation results and uplink buffer status to the RAN 430 through this interface.

With regard to the core network (CN) 410, the core network 410 can correspond to the backbone network, and the core network 410 can be configured with a controller interface 411 which allows reporting UE 440 DL and UL traffic volumes, QoS, and traffic types (e.g., TCP, UDP, HTTP based live streaming) to the controller 420. The core network 410 can furthermore be configured to perform deep packet inspection (DPI) to analyze traffic and identify the traffic types.

Figure 5:
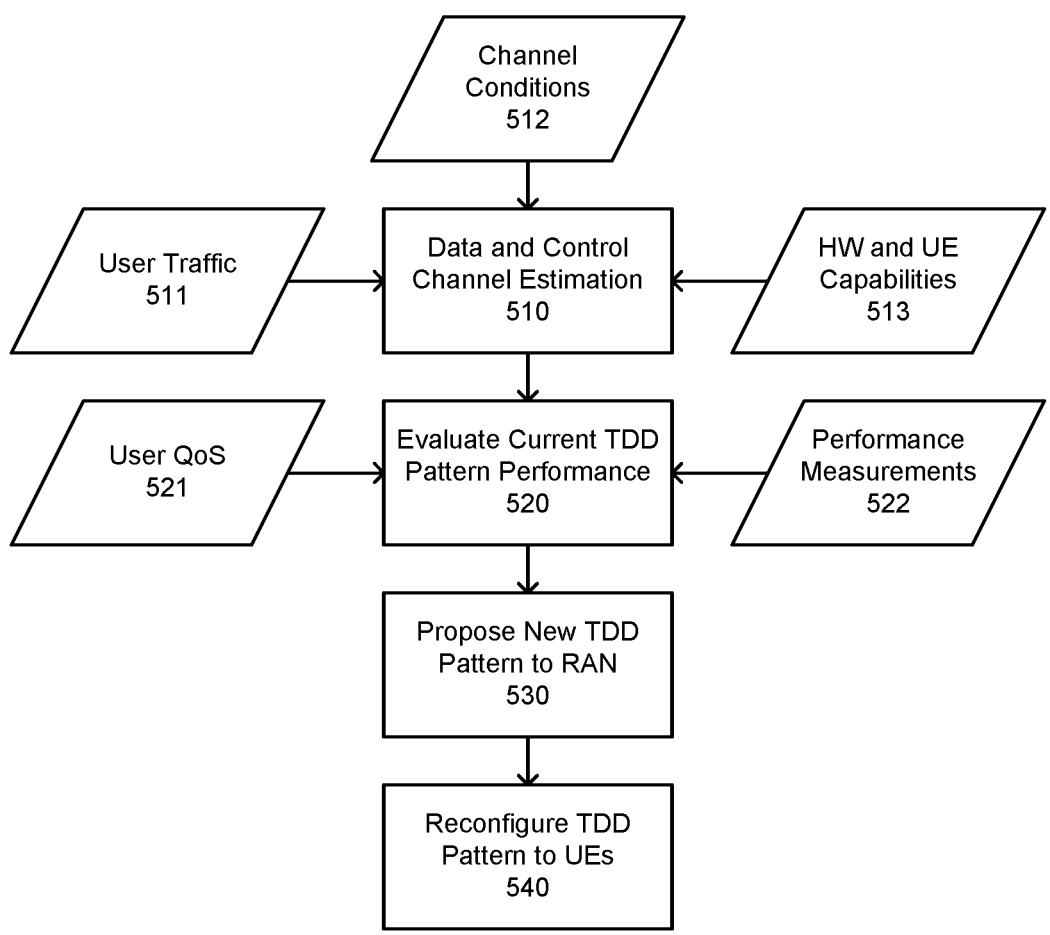
FIG. 5 is a flow diagram representing example operations of to configure TDD patterns for application by RAN nodes, in accordance with various aspects and embodiments of the subject disclosure.

FIG. 5 is a flow diagram representing example operations of to configure TDD patterns for application by RAN nodes, in accordance with various aspects and embodiments of the subject disclosure. FIG. 5 includes data and control channel estimation 510, evaluate current TDD pattern performance 520, propose new TDD pattern to RAN 530, and reconfigure TDD pattern to UEs 540. Data and control channel estimation 510 can make use of user traffic 511, channel conditions 512, and hardware (HW) and UE capabilities 513. Evaluate current TDD pattern performance 520 can make use of user QoS 521 and performance measurements 522. Methods according to FIG. 5 can optionally be carried out using an architecture such as illustrated in FIG. 4.

At data and control channel estimation 510, data channel demand in DL can be estimated using the channel conditions 512 (e.g. channel quality indications (CQI) or average modulation and coding scheme (MCS) used for the UE), the number of multi input multi output (MIMO) layers (based on UE capabilities and radio HW) 513, and the total amount of traffic requested by each UE 511.

In some embodiments, the amount of resources needed for DL can be calculated based on, e.g., a number of DL slots to transfer the full amount of data; the UL channel conditions of the user (e.g. UL signal-to-interference-plus-noise ratio (SINR)); the PUCCH configuration (e.g. format 1); and/or the availability of UL data that can multiplex the HARQ feedback on PUSCH.

In some embodiments, the amount of resources for UL data transfer can be calculated based on, e.g., a number of UL slots to transfer the full amount of UL traffic demand; the control channel element (CCE) aggregation level (based on the channel conditions in DL); and/or a flag to indicate whether the UE has preconfigured grant enabled and thus no need to consider DL control resources.

At evaluate current TDD pattern performance 520, in some embodiments, a currently used TDD pattern can be evaluated by comparing the current measured network KPIs (e.g., cell throughput) against target values set by the operator. In some embodiments, the currently used TDD pattern can be evaluated by comparing the current DL/UL ratio computed at operation 510 against a target ratio. In some embodiments, the currently used TDD pattern can be evaluated by comparing a current packet delay against a target packet delay budget received form the core network. If a target performance is not met, then a new TDD pattern can be deemed necessary. The evaluation of performed at 520 can be stored as an evaluation criterion (i.e. reward value) for assessment of TDD patterns.

At propose new TDD pattern to RAN 530, using the data calculated at operation 510, either a previously stored TDD pattern that was deemed optimal for similar network conditions (e.g. UL and DL data and control demand), or a new TDD pattern can be proposed. The new TDD pattern can be computed and stored, and can consider the evaluation in operation 520, (e.g. a new TDD pattern can comprise a lower DL and UL offset if a delay budget was violated). The new TDD pattern can also consider the HW capability of a RAN node in switching between DL and UL. The proposed TDD pattern can optionally also be sent to other neighboring cells that can accommodate the new TDD pattern either by configuring the same TDD pattern or avoiding transmitting in the time slots that are not matching the TDD new pattern.

Reconfigure TDD patterns to UEs 540 can be applied when the signaling overhead is low and no emergency service is in progress, to avoid service outage. The UEs can be reconfigured with the proposed TDD pattern from operation 530, via RRC messages or DCI.

In some embodiments, an architecture such as illustrated in FIG. 4 and methods according to FIG. 5 can enable control channel and capability aware traffic estimation. Control channel demand for both UL and DL can be considered, as well as the variation of such demand due to enabling other features such as preconfigured grants. Capabilities of the gNBs and UEs can also be considered when determining needed spectrum resources (e.g. whether UEs are capable of more MIMO layers and component carriers in DL compared to UL which yields different spectrum efficiencies between DL and UL). UE RF conditions can be considered, whereby UEs at different locations of a cell, e.g., cell center or cell edge UEs can be treated differently when deciding the TDD patterns and resource allocations to optimize performance.

In some embodiments, an architecture such as illustrated in FIG. 4 and methods according to FIG. 5 can enable pattern structure configuration. Beside the traffic ratio of UL and DL, the time offset between DL and UL slots can be adjusted to secure a fast-reliable feedback required for ultra-reliable low latency communication (URLLC) services. In addition, 3GPP limitations on such offsets can be accommodated.

In some embodiments, an architecture such as illustrated in FIG. 4 and methods according to FIG. 5 can minimize the number of TDD pattern reconfigurations by muting transmission in some slots when the demand is lower than available spectrum (i.e. in low-load scenarios).

In some embodiments, an architecture such as illustrated in FIG. 4 and methods according to FIG. 5 can enable priority awareness. Traffic priority, e.g., QoS, can be considered to prioritize the demands of different types of traffic. Traffic demands as well as latency requirements can be accounted for to select optimal TDD patterns. To meet high latency targets, the TDD patterns with shorter DL and UL switching cycles can be selected, and sufficient resources can be provided for control channels and/or application-level feedback.

In some embodiments, an architecture such as illustrated in FIG. 4 and methods according to FIG. 5 can enable mixed pattern deployments. Non-unified patterns within a cluster can achieve better performance in some scenarios. Examples of those scenarios include when CLI is not dominant, e.g., for indoor clusters/cells, or when UEs are close to their serving cell center, or when cells comprise different DL to UL requirements compared to other cells. Intelligent joint scheduling algorithms can be used to avoid/mitigate CLI when neighbor cells are configured with non-unified patterns.

In some embodiments, an architecture such as illustrated in FIG. 4 and methods according to FIG. 5 can enable dynamic TDD patterns, to dynamically assign TDD patterns in selected cells or a whole cluster. A joint scheduler at the controller can be used to satisfy a prioritized cell's traffic demands and avoid CLI. The utilization of dynamic TDD patterns can provide flexibility on TDD pattern changes and avoid overhead compared to static/semi-static TDD pattern reconfiguration (e.g., when cells have to be aligned on the timing of static/semi-static TDD pattern changes).

A variety of different embodiments can be designed according to this disclosure. Five different example embodiments are considered in particular herein. A first example embodiment can include a centralized configuration in which a controller connected to multiple cells collects data and control channel demands, the priority of the traffic, and capabilities of users to estimate optimal TDD pattern configurations.

A second example embodiment can extend the first embodiment to predict future demands and proactively reconfigure TDD patterns with longer lifetimes. Thus, the second embodiment can avoid excessive TDD reconfigurations and can satisfy future traffic requirements.

A third example embodiment can select TDD patterns based on network standardized KPIs and user QoS metrics. This embodiment can be useful when either a) the traffic demands are unavailable (e.g. incompatible a core network in multivendor deployments), or b) channel conditions are uncertain due to high network dynamics (e.g. high mobility).

A fourth example embodiment can be configured for opportunistic selection of optimal TDD patterns for each cell. Based on, e.g., a cell characterization (e.g., indoor vs outdoor), UE distribution, priority of services and load status, topology of the cells, etc., the controller can divide cells into multiple TDD configuration sub-groups and calculates TDD patterns for each sub-group. Cells can follow different scheduling policies to avoid/mitigate CLI.

A fifth example embodiment can utilize the dynamic TDD pattern configuration feature in 5G systems to dynamically assign TDD patterns in some cells. A joint scheduler at the controller can be used to avoid CLI.

Figure 6:
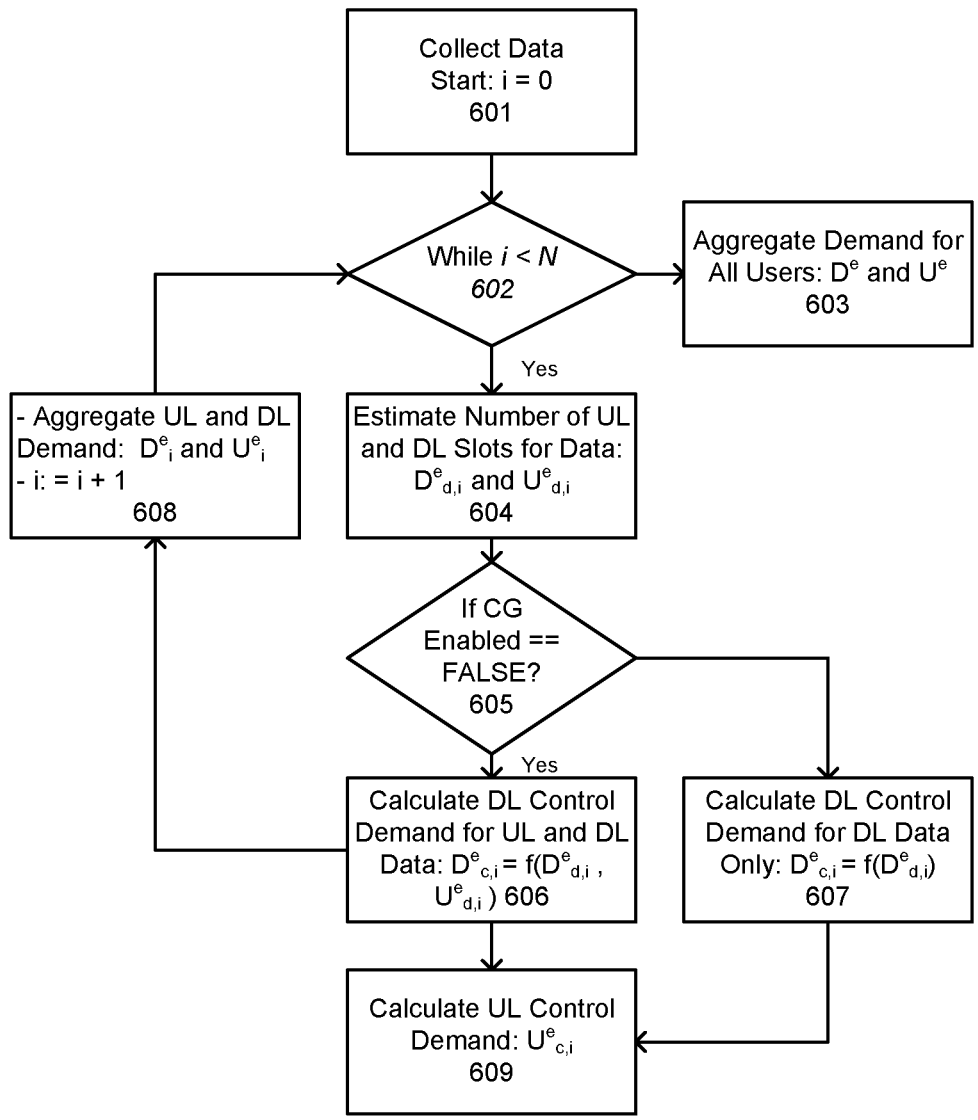
FIG. 6 is a flow diagram representing example operations which can be performed in connection with demand estimation, in accordance with various aspects and embodiments of the subject disclosure.

FIG. 6 is a flow diagram representing example operations which can be performed in connection with demand estimation, in accordance with various aspects and embodiments of the subject disclosure. Methods according to FIG. 6 can be performed, e.g., in connection with the first embodiment introduced above. FIG. 6 includes collect data 601, while i<N 602, aggregate demand for all users 603, estimate number of UL and DL slots for data 604, if configured grant (CG) enabled==FALSE? 605, calculate DL control demand for UL and DL data 606, calculate DL control demand for DL data only 607, calculate UL control demand 609, and aggregate UL and DL demand 608. The variables used in connection with operations 601-608 are explained in further detail below.

In embodiments according to FIG. 6, the UL and DL demand for both data and control channels can be considered to evaluate a currently configured TDD pattern and propose a new TDD pattern if needed. The demand calculation can be based on both RF conditions and UE capabilities.

To conduct user demand estimation, for each user i, in a set of users N, the demanded data and control channel slots can be calculated as follows: The number of DL slots needed for serving the downlink traffic (assuming DL data only) is denoted by $D^e_{d,i}$, and computed as following: $D^e_{d,i}=B_{d,i}/R_{d,i}$, where: $B_{d,i}$ is the total number of bits requested in DL for user i; and $R_{d,i}$ is the average DL bits that can be transmitted to user i each slot.

$R_{d,i}$ can be calculated as $R_{d,i}=L_{d,i}*S_{d,i}$, where: $L_{d,i}$ is the number of MIMO layers used for this UE i, based on rank indicator in CSI report (function of channel conditions and UE HW capabilities); and $S_{d,i}$ is the transport block size in bits computed by the DU resource allocator based on the reported CQI.

For calculating a number of UL slots needed for serving the uplink traffic (assuming UL data only), denoted by $U^e_{d,i}$, the same procedure as $D^e_{d,i}$ can be followed.

For calculating the DL control demand $D^e_{c,i}$ if the user has configured grant activated (i.e. can transmit data without PDCCH resources), then the demand control channel is due to DL assignments, and thus $D^e_{c,i}=D^e_{d,i}$. Otherwise, it can be assumed that each UL slot carrying data will require one UL grant on PDCCH; thus $D^e_{c,i}=f(D^e_{d,i}+U^e_{d,i})$, where f(.) is a sum function if the UE requires the full slot to transmit one PDCCH; otherwise, f(.) is a max function. Where the ability of UE to transmit both DL and UL control in the same slot depends on the cell bandwidth and the control channel aggregation level (according to the UE channel conditions).

For calculating the UL control demand $U^e_{c,i}$ it can be assumed that the HARQ feedback of every m DL slots is reported on one PUCCH format resource; thus $U^e_{c,i}$ can be calculated as: $U^e_{c,i}=D^e_{d,i}/m$; where m can be assumed to be design factor based on the maximum tolerable HARQ feedback delay; for instance; m=10 means that the HARQ feedback of the first DL slot will be received after 10 scheduling slots.

To conduct demand aggregation, a total download demand for user i aggregates the data and control as: $D^e_i=w1*D^e_{c,i}+w2*D^e_{d,i}$ if time multiplexing of DL resources between data and control is allowed; otherwise, $D^e_i=D^e_{c,i}+D^e_{d,i}$. Where w1 and w2 are weights that represent the amount of control and data scheduled in the same slot; $0<w1+w2<=1$.

Similarly, the total uplink demand for user i aggregates the data and control as: $U^e_i=\max(U^e_{c,i}, U^e_{d,i})$ to account for UCI multiplexing on PUSCH; otherwise, $U^e_i=+U^e_{d,i}$. The demand for all users in the current cell can be aggregated as:

$$D^e=\Sigma_i D^e_{c,i} \text{ and } U^e=\Sigma_i U^e_{c,i}$$

Figure 7:
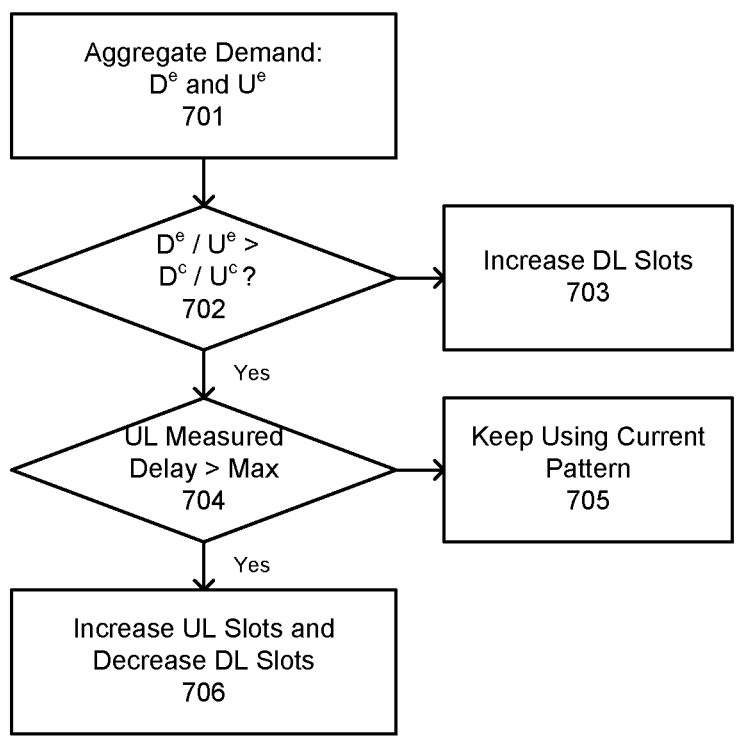
FIG. 7 is a flow diagram representing example operations which can be performed in connection with TDD pattern evaluation, in accordance with various aspects and embodiments of the subject disclosure.

FIG. 7 is a flow diagram representing example operations which can be performed in connection with TDD pattern evaluation, in accordance with various aspects and embodiments of the subject disclosure. Methods according to FIG. 7 can be performed, e.g., in connection with the first embodiment introduced above. FIG. 7 includes aggregate demand: $D^e$ and $U^e$ 701, $D^e/U^e>D^c/U^c$? 702, increase DL slots 703, UL measured delay>Max 704, keep using current pattern 705, and increase UL slots and decrease DL slots 706.

At 702, the ratio between DL and UL (i.e. $D^e/U^e$) calculated according to FIG. 6 can be compared against the ratio in a current pattern (i.e., $D^c/U^c$). If the estimated ratio is above the current configured one, it indicates that more DL resources are needed, and thus the amount of DL slots can be increased (at the expense of UL slots). Otherwise, if the UL measured delay is above a certain threshold (e.g. specified in the QoS parameters from the core network); it indicates that more UL sources are needed. Thus, the number of UL slots can be increased (at the expense of DL slots). If both DL and UL demands are satisfied, the current TDD pattern can remain selected.

Subsequent to operations according to FIG. 7, multicell pattern alignment can optionally be performed. In a first example multicell pattern alignment method, demand calculations according to FIG. 6 and FIG. 7 can include all the users in a cell cluster, i.e. $N=\{N_1, N_2, \ldots N_C\}$. As such, methods according to FIG. 7 will result in a single pattern for the cluster, and the pattern corresponds to the average demand ratio between DL and UL.

In a second example multicell pattern alignment method, the set of users in FIG. 6 and FIG. 7 corresponds only to the users served by a cell c, i.e., $N=N_c$. Thus, FIG. 6 and FIG. 7 can be repeated for each cell managed by the controller. The cell with the highest priority (e.g. aggregate priority of connected UEs) or the highest load will have a higher weight and the TDD pattern can be selected for that cell. The controller can then select the TDD pattern P that satisfies the maximum number of cells as per the following utility function:

$$P = \arg\max I_c * W_c$$

Where: $I_c$ equals 1 if the pattern of cell c is selected; and 0 otherwise. $W_c$ is the normalized weight of cell c; computed as the cell PRB utilization or the total priority weight of connected users.

In the second embodiment introduced herein, the first embodiment, described above can be extended by predicting future demands and proactively reconfiguring TDD patterns with longer lifetimes. Thus, the second embodiment can avoid excessive reconfiguration and satisfy future traffic requirements. Such embodiments can be useful for delay sensitive applications (e.g. URLLC) with stringent packet drop requirements.

In an example, the downlink and uplink demand (including both data and control) can be estimated for a next time epoch (t+1), based on the demand values calculated in previous epochs (t, t−1, ... t−n). An example of estimated downlink demand is as follows:

$$D^e(t+1) = \alpha_t D^e(t) + \alpha_{t-1} D^e(t-1) + \ldots + \alpha_{t-n} D^e(t-n)$$

Where: n is the number of previous measurements (i.e. lags); and $\alpha_t$ is the weight of measurements in epoch t, which reflects how much a measurement shall contribute in calculating the future value.

Figure 8:
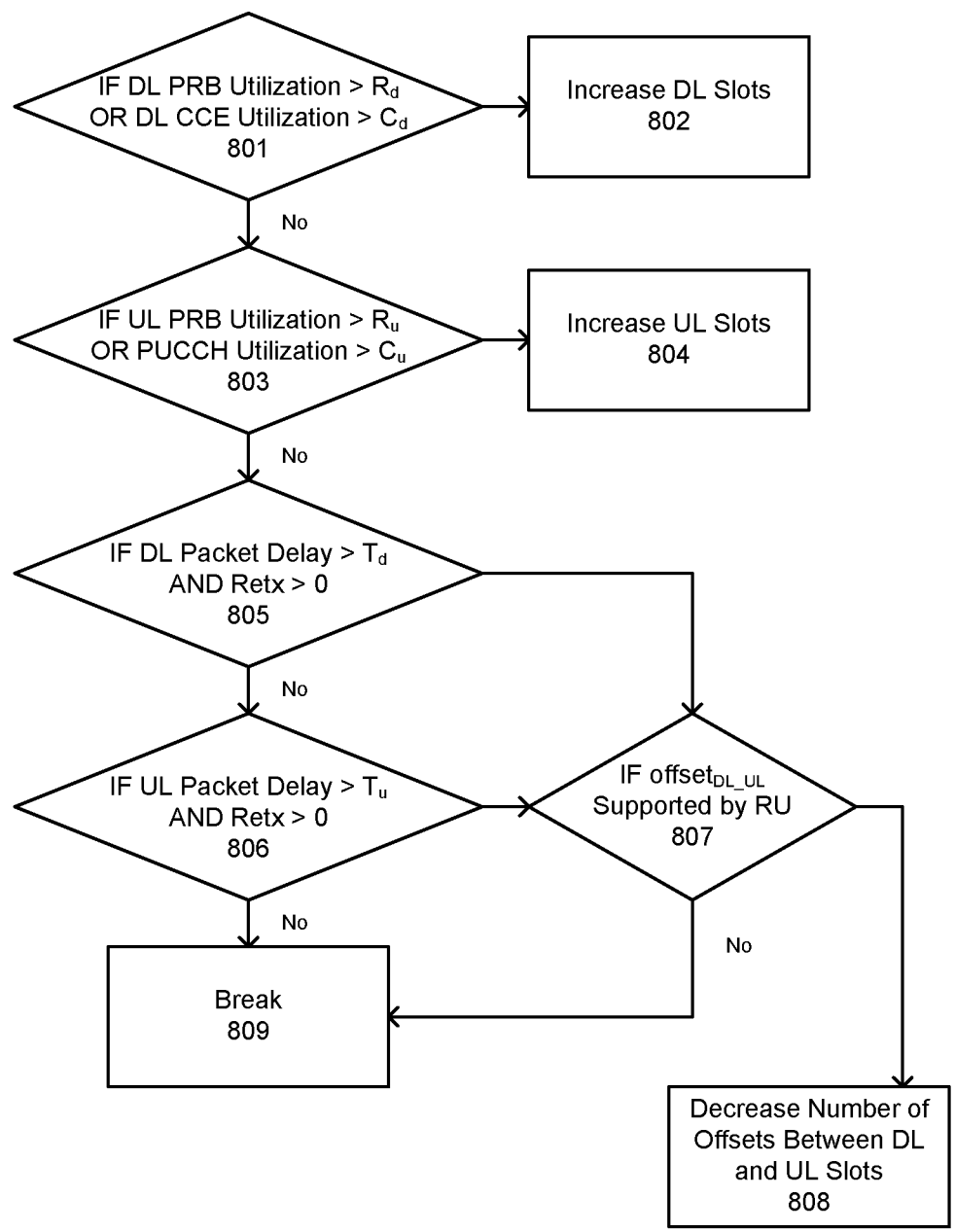
FIG. 8 is a flow diagram representing example operations to perform TDD pattern evaluation based on standardized network KPIs and user QoS metrics, in accordance with various aspects and embodiments of the subject disclosure.

FIG. 8 is a flow diagram representing example operations to perform TDD pattern evaluation based on standardized network KPIs and user QoS metrics, in accordance with various aspects and embodiments of the subject disclosure. Methods according to FIG. 8 can be performed, e.g., in connection with the third embodiment introduced herein. FIG. 8 includes IF DL PRB Utilization>$R_d$ OR DL CCE Utilization>Cd 801, Increase DL Slots 802, IF UL PRB Utilization>$R_u$ OR PUCCH Utilization>$C_u$ 803, Increase UL Slots 804, IF DL Packet Delay>$T_d$ AND Retx>0 805, IF UL Packet Delay>$T_u$ AND Retx>0 806, IF offset$_{DL\_UL}$ Supported by RU 807, Decrease Number of Offsets Between DL and UL Slots 808, and Break 809.

In FIG. 8, TDD pattern evaluation can be based on network standardized network KPIs and user QoS metrics. This third embodiment is useful when either a) the traffic demands are unavailable (e.g. incompatible core network in multivendor deployment), or b) channel conditions are uncertain due to high network dynamics (e.g. high mobility). This embodiment avoids unnecessary TDD pattern reconfiguration if the target KPIs (e.g. delay) are satisfied, even though the DL to UL demand ratios do not match a configured pattern.

A first example KPI that can be used in some embodiments along with corresponding target metrics defined by the operator is: DL PRB utilization=$P_D(T)/P_{BW,D}(T)*100$, where: $P_D(T)$ is the count of full physical resource blocks; all PRBs used for DL traffic transmission shall be included. $P_{BW,D}(T)$ is the total number of PRBs available for DL traffic transmission during time period T; and T is the time period during which the measurement is performed.

The above KPI captures the impact of UE capabilities, radio conditions and traffic load on the DL demand. For instance, large traffic demand requested under bad radio conditions (e.g. low SINR) and low UE capabilities (e.g., single MIMO layer) will result in larger value compared to the same traffic demand under good radio conditions (e.g. high SINR) and high UE capabilities (e.g., four MIMO layers).

A second example KPI that can be used in some embodiments along with corresponding target metrics defined by the operator is: UL PRB utilization=$P_U(T)/P_{BW,U}(T)*100$, where: $P_U(T)$ is the count of full physical resource blocks; where all PRBs used for UL traffic transmission shall be included; $P_{BW,U}(T)$ is the total number of PRBs available for DL traffic transmission during time period T; and T is the time period during which the measurement is performed.

A third example KPI that can be used in some embodiments along with corresponding target metrics defined by the operator is: CCE Utilization=$P_{CCE}(T)/P_{BW,CCE}(T)*100$, where: $P_{CCE}(T)$ is the count of used CCEs; where all CCEs used for UL or DL grants shall be included (this parameter will have a lower value if UL configured grant is utilized). $P_{BW,CCE}(T)$ is the total number of CCEs available for DL and UL grants during time period T; and T is the time period during which the measurement is performed. Users experiencing bad radio conditions or sporadic traffic demands (e.g. voice traffic) will result in larger value compared to other users experiencing good RF conditions or requesting steady demand (e.g. file download).

A fourth example KPI that can be used in some embodiments along with corresponding target metrics defined by the operator is: PUCCH Utilization=$P_{PUCCH}(T)/P_{PUCCH,BW}(T)*100$, where: $P_{PUCCH}(T)$ is the count of used PUCCH resources for HARQ feedback or scheduling request; $P_{PUCCH,BW}(T)$ is the total number of PUCCH resources available for HARQ feedback and scheduling request during time period T; and T is the time period during which the measurement is performed.

A fifth example KPI that can be used in some embodiments along with corresponding target metrics defined by the operator is: DL Packet delay=$\sum_{p \in P}(T_{p,ACK} - T_{p,MAC})/|P|$, where $T_{p,ACK}$ is the time when a HARQ ACK (for RLC UM) or RLC ACK (for RLC AM) is received from the UE confirming reception of RLC SDU; $T_{p,MAC}$ is the time when the MAC layer received RLC SDU p for transmission over the air; and P is the set of RLC SDUs transmitted over the time period during which the measurement is performed.

A sixth example KPI that can be used in some embodiments along with corresponding target metrics defined by the operator is: UL Packet delay=$\Sigma_{p \in P}(T_{p,Rx} - T_{p, SCHED})/|P|$, where $T_{p,Rx}$ is the time when the MAC SDU was received successfully by the network; $T_{p, SCHED}$ is the time when the UL MAC SDU p was scheduled (i.e. network provides a transmitting grant); P is the set of MAC SDUs transmitted over the time period during which the measurement is performed.

In FIG. 8, Retx is a Boolean flag indicating if SDUs are retransmitted from RLC due to the reception of NACK from the lower layers. This flag can be used to consider only the TDD pattern optimization when the delay is due to delayed feedback between DL and UL; and not due to other sources such as low processing capabilities or slow backbone connection to the server that are irrelevant to the TDD pattern configuration.

In FIG. 8, IF either the DL PRB utilization or Control Channel Elements (CCE) utilization is high at 801; then more DL resources are needed; and thus, the number of DL slots can be increased at 802. ELSE, IF either the UL PRB utilization or PUCCH resources utilization is high at 803; then more UL resources are needed; and thus, the number of UL slots can be increased at 804.

ELSE, the current DL to UL ratio can be deemed to be optimal and the delay can be checked for possible optimization of DL to UL offset as following: IF the DL packet delay or UL packet delay is high (and retransmission happens) at 805, then: IF the radio capability can afford a smaller time offset at 807, then, the offset between DL and UL can be decreased to provide a faster HARQ and RLC feedback to the network at 808. Otherwise, the current pattern is not changed. ELSE, if the packet delay is within the budget at 807, then the current pattern can be deemed optimal. An example of two patterns with the same UL and DL ratio, but with different time offsets is illustrated in FIG. 3.

It is noted that in embodiments according to FIG. 8, the downlink performance can be checked prior to the uplink; since the system assumes that: 1) downlink traffic has higher priority than uplink, and 2) downlink is the bottleneck for uplink traffic, since the lack of control downlink channels will result in low uplink utilization. Based on the supported services, the operator can determine that uplink traffic has higher priority than downlink. In such case, the PRB utilization and packet delay can be checked for UL before the DL.

Figure 9:
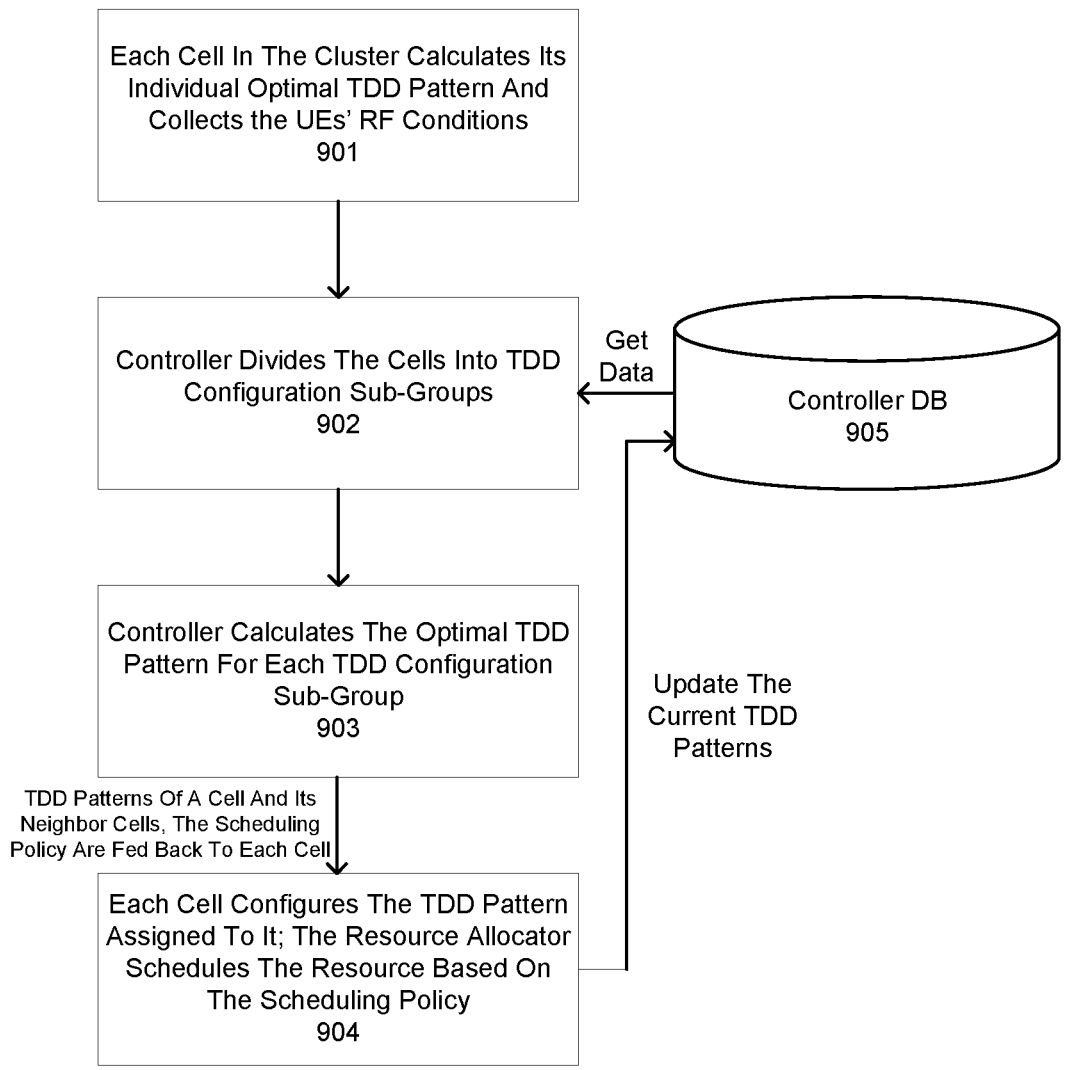
FIG. 9 is a flow diagram representing example operations performed in an embodiment in which TDD patterns are calculated for individual cells, in accordance with various aspects and embodiments of the subject disclosure.

FIG. 9 is a flow diagram representing example operations performed in an embodiment in which TDD patterns are calculated for individual cells, in accordance with various aspects and embodiments of the subject disclosure. Methods according to FIG. 9 can be performed, e.g., in connection with the fourth embodiment introduced herein.

FIG. 9 includes, Each Cell In The Cluster Calculates Its Individual Optimal TDD Pattern And Collects the UEs' RF Conditions 901, Controller Divides The Cells Into TDD Configuration Sub-Groups 902, Controller Calculates The Optimal TDD Pattern For Each TDD Configuration Sub-Group 903, and Each Cell Configures The TDD Pattern Assigned To It; The Resource Allocator Schedules The Resource Based On The Scheduling Policy 904. Various operations can use a controller database 905, as illustrated.

In embodiments according to FIG. 9, instead of using a unified TDD pattern for a whole cluster of cells, each cell can first calculate an optimal TDD pattern individually, and then based on the individual cell's optimal TDD pattern, as well as cell characterization data from the controller database 905, the UEs distribution, the priority of the services and load status, topology of the cells, etc., the controller divides the cells into multiple TDD Configuration Sub-groups and calculates the TDD pattern for each sub-group. The controller then sends to each cell its own TDD pattern and the TDD patterns of its neighboring cells. Cells can follow a policy to avoid allocating resources in the slot that has a misaligned slot configuration (i.e. an opposite DL/UL direction) with its neighbor cells to avoid/mitigate CLI.

Solutions according to FIG. 9 can comprise four main operations. At 901, each cell calculates its individual optimal DL to UL ratio. The calculation can be, e.g., according to FIG. 6, 7, or 8. Each cell can also collect the UEs' RF conditions data. Those data are fed into the centralized controller.

At 902, the controller can utilize the data it collects from operation 901 and the data in the database 905 (e.g., which cells are indoor, which cells are an indoor cluster, inter-cell distances, which cells have multi-operator neighbors, cells' topologies, cells' current TDD patterns, etc.) to divide all the cells into TDD configuration sub-groups and then, at 903, calculate the optimal TDD pattern for each sub-group. To achieve this, the controller can use the following example rules.

In a first example rule, for indoor sub-groups: a cluster of indoor cells can be treated as one TDD configuration sub-group. A cluster of indoor cells can be defined as indoor cells serving the same building and the CLI to and from the outdoor cells are negligible. The number of the cells in an indoor sub-group can be one if there is only one cell in a building (e.g., a small business building). The indoor cluster cell information can be stored in the controller database 905.

In a second example rule, for multi-operator border sub-groups: adjacent cells with multi-operator neighbors and which are not classified as indoor sub-groups can form a multi-operator border sub-group. There can be multiple layers of cells in this sub-group depending on the distance to the multi-operator neighbors and the CLI isolation requirement. This sub-group can remain on a TDD pattern aligned with the other operator. Cells in this sub-group can skip the operation 901.

In a third example rule: for low CLI sub-groups: if the UEs in a cell x are close to a cell center and the UEs in all its neighbor cells are far away from the UEs in cell x, then cell x can be treated as a low CLI sub-group. The decision regarding whether a UE is near a cell center can be based on the UE RF conditions reported, cell topology, and the inter-cell distances in the database 905.

In a fourth example rule, for traffic deviation sub-groups: for all the cells which are not in the other sub-groups, the controller can first calculate their unified TDD pattern using processes according to FIG. 6-FIG. 8. The DL to UL ratio of the unified TDD pattern can be represented as $$\frac{D}{U}.$$

Next, the controller can find the traffic deviation cells, i.e., find the cells satisfying the following two conditions: i) the deviation of the cell's estimated DL to UL ratio to the DL to UL ratio of the unified TDD pattern is larger than the traffic deviation threshold $T_D$:

$$\frac{\left|\left(\frac{D^e}{U^e}\right)i - \frac{D}{U}\right|}{\frac{D}{U}} > T_D$$

where $$\left(\frac{D^e}{U^e}\right)_i$$

is cell i's estimated DL to UL traffic ratio; and ii) the cell's current DL or UL load and/or estimated/predicted load is high. The above equation is referred to herein as equation one. If a cell meets the above two condition, it can be marked as a traffic deviation cell. This means the cell has high DL and/or UL traffic volume and the current unified TDD pattern cannot be a good fit of the cell.

The controller can rank the traffic deviation cells based on their priority (e.g. aggregate priority of the services of connected UEs) and/or the load. Starting from the traffic deviation cell that ranked first, the controller can form the tentative traffic deviation sub-groups following the steps below.

First, for a cell i, compare its estimated DL to UL ratio and its neighbor cell j's estimated DL to UL ratio. If the two ratios' difference is less than the threshold Ts, i.e., $$\left|\left(\frac{D^e}{U^e}\right)_i - \left(\frac{D^e}{U^e}\right)_j\right| / \left(\frac{D^e}{U^e}\right)_i < Ts$$

then the two cells are grouped together. The above equation is referred to herein as equation two. All the cell i's neighbors are checked by this process. If one of cell i's neighbor cell (e.g., cell x) is grouped together with the cell i, then all the cell x's neighbor will be checked as well against cell i's DL to UL ratio following the above equation.

It is possible that there is only 1 cell in a traffic deviation sub-group. All neighbors can be checked whether or not such cell is a traffic deviation cell.

Second, once cell i's tentative traffic deviation sub-group is formed, the traffic deviation cell with the next highest rank but not in any tentative traffic deviation sub-group can be processed by equation two.

Third, the processes of the first and second steps, above, can continue until all the traffic deviation cells are grouped into tentative traffic deviation sub-groups.

Fourth, once the tentative traffic deviation sub-groups are formed, the controller can use the topology information of the cells and check if any of the tentative traffic deviation sub-groups are neighbors. For any of the neighboring tentative traffic deviation sub-groups, the controller can keep one of them as the traffic deviation sub-group while removing the other one. The tentative sub-group with overall higher priority and/or load can be kept. The tentative traffic deviation sub-groups can be checked to ensure no two sub-groups are neighbors with different DL to UL traffic demands. The final traffic deviation sub-groups can be formed.

One example of usage of the traffic deviation sub-group is: when a region has an ad-hoc event which triggers a lot of UL live streaming, the required DL to UL ratio of this region can change significantly and a same trend could impact multiple neighboring cells serving the region. A real-life example could be, e.g., a few cells serving an outdoor concert. Before the concert starts, there could be high demands on DL traffic, but after the concert starts, more UL traffic could be in demand for social media live streaming.

The Thresholds $T_D$ and $T_S$ can be configurable. $T_D$ can be larger than $T_S$. The values of those thresholds can be changed based on different network optimization targets and can optionally be optimized by AI/ML.

In a fifth example rule, cells that are not in any of the above sub-groups, applicable to the first, second, third or fourth rule, can be put into another sub-group, referred to herein as residue sub-group.

At 903, after the TDD configuration sub-groups are formed, the controller can decide the optimized TDD pattern for each sub-group. The decision can be based on the following criteria: first, the multi-operator neighbor sub-group can only use the TDD pattern as aligned with other operators; second, the controller can calculate the optimal common TDD pattern for each indoor sub-group, low CLI sub-group, traffic deviation sub-group, and residue sub-group based on the described with reference to the first and third embodiments disclosed herein.

At 904, the controller can feed each cell the TDD patterns of its own and its neighbors' cells. The controller can also tell each cell which sub-group it belongs to and the scheduling policy for the RAN resource allocator for resource scheduling. Each cell can configure its TDD pattern based on the controller's input.

An example of the scheduling policy is, for any cell that is in the indoor sub-group, multi-operator neighbor sub-group, low CLI sub-group, and traffic deviation sub-groups, the RAN resource allocator can do the scheduling based on the assigned TDD pattern. For any cell that is in the residue sub-group and with a neighbor that has a different TDD pattern, the RAN resource allocator can try to avoid data allocation on the slot where its neighbor cell is using a different DL/UL direction. This rule can be followed more strictly for the cell with a traffic deviation sub-group and multi-operator neighbor sub-group neighbor since there could be no good isolation from those cells. More complicated scheduling policies can include, e.g., use of the joint scheduler as introduced in the fifth embodiment, or use of artificial intelligence or machine learning (AI/ML) to optimize the policy.

The fifth embodiment introduced herein can utilize the dynamic TDD pattern configuration feature in 5G networks to dynamically assign the TDD pattern in selected cells or in a whole cluster. A joint scheduler at the controller can be used to satisfy a prioritized cell's traffic demands and avoid CLI.

In a first variation of the fifth embodiment, dynamic TDD can be used for cells with deviated TDD pattern requirements. When one unified TDD pattern is used for a whole cluster (e.g., by applying FIG. 6-FIG. 8), there can be some cells who's desired TDD ratio is significantly different from the unified TDD pattern selected. Those cells can suffer performance degradation and congestion. A dynamic TDD pattern and a joint scheduler can be used to solve this issue and improve system performance.

First, a dynamic TDD cell can be selected. Any cell i that meets the following two conditions can be selected as a dynamic TDD cell with high deviation. As a first condition, the cell's estimated DL to UL traffic ratio is different compared to the cluster selected TDD pattern's DL to UL ratio, i.e.:

$$\left|\left(\frac{D^e}{U^e}\right)_i - \left(\frac{D^e}{U^e}\right)_C\right| / \left(\frac{D^e}{U^e}\right)_C > T$$

where $$\left(\frac{D^e}{U^e}\right)_i$$

is cell i's estimated DL to UL traffic ratio, $$\left(\frac{D^e}{U^e}\right)_C$$

is the cluster TDD pattern's DL to UL ratio, and T is the threshold that can be configurable. As a second condition, the Cell's current DL or UL load and/or estimated/predicted load is high.

If a cell is selected as a dynamic TDD cell with high deviation, we allocate the TDD pattern for cell i with a few flexible (F) slots and symbols. The number of F slots and symbols can be decided by: if configuring those F slots/symbols to a different direction than the cluster's TDD pattern, the $$\left(\frac{D^e}{U^e}\right)_i$$

can be met most closely. E.g., if cell i's estimated DL to UL ratio is 0.55, but the cluster's TDD pattern is DDD-SUUDDDD (S: 6:4:4), we can assign the TDD pattern of cell i as DDDSUUFFFF (S: 6:4:4). Therefore, if all the F slots are U, we get DDDSUUUUUU (S: 6:4:4) and the DL to UL ratio is −0.55.

Once a cell is selected as a dynamic TDD Cell with high deviation, all its neighbor cells can also be selected as dynamic TDD neighbor cells and can use the same dynamic TDD pattern as the selected cell.

If a cell is the neighbor of multiple dynamic TDD cells with high deviation, or a cell is a dynamic TDD cells with high deviation and it is also a neighbor of one or multiple dynamic TDD cells with high deviation, it can use the union set of F slots and symbols based on its own requirement and its neighbors' requirements. E.g., a dynamic TDD cell with high deviation can use TDD pattern DDDSUUDDFF to fit its estimated DL to UL ratio. But if it is also required to use the TDD pattern DDDSUUFFFF due to its dynamic TDD cell with high deviation neighbor, then it can be configured with DDDSUUFFFF where has the union set of the F slots.

Next, all the cells' TDD patterns can be decided. Both the dynamic TDD cells with high deviation and dynamic TDD neighbor cells are marked as dynamic TDD cells. The dynamic TDD cells can be configured with flexible slots. All the cells that are not selected as dynamic TDD cells can be marked as non-dynamic TDD cells. They can use the unified TDD pattern selected for the cluster and all the slots' DL or UL directions can be defined.

Finally, the controller can send TDD pattern information to each cell. Each cell sends semi-static TDD pattern information to the UEs.

Second, the controller can use a joint scheduler to schedule the data for each cell and decide the DL/UL direction of each F slot. The joint scheduler can first schedule data for the non-dynamic TDD cells. For those cells, the joint scheduler can first allocate resources on the slots that are with the same direction of the neighbor cells. If those slots are not enough, the other slots will be used. Any slot that is not scheduled with data can be marked as E (empty) slot. The joint scheduler can first work on the non-dynamic TDD cells that with a dynamic TDD cell neighbor, so if there is not a lot of data to be transmitted, there will be some E slots in the non-dynamic TDD cells that are aligned with the F slots of the dynamic TDD cell neighbor.

For each dynamic TDD cell, the joint scheduler can first allocate resources on the D and U slots. If the D and U slots are enough, all the slots are not scheduled with data will be marked as E slots. If the D and U slots are not enough, it will consider using the F slots. The following steps need to be followed for those cells which want to use the F slots: Rank all the dynamic TDD cells based on the highest priority (e.g. aggregate priority of the services of connected UEs) and/or load. Start with the cell with the highest rank. If the F slot of this cell has a neighbor that has already been scheduled and is with a defined D/U slot on the same time, then this F slot must follow its neighbor's UL/DL direction. If all its neighbors have only E or F on the same slot, then, D or U direction is assigned to this cell based on the data requirement of this cell. If the F slot is with neighbors of different direction on this slot, then no data should be scheduled on this slot to avoid CLI. If no data is to be scheduled on a F slot, it will be marked as E slot. Use the process for cells in the $2^{nd}$, and $3^{rd}$, . . . rank until all the dynamic TDD cells' F slots are decided.

The joint scheduler can send the F slots and E slots info to each cell and inform the RAN resource allocator how to do the scheduling on each cell. The RAN resource allocator can assign the direction of the F slots to the UEs (through DCI), allocate the resources, and follow the rules of the joint scheduler to not use the E slots.

This process utilizes the dynamic TDD configuration feature of 5G to give cells that have different TDD ratio requirements compared to the cluster's TDD pattern opportunities to use different dynamic TDD patterns to avoid suffering from performance degradation. The joint scheduler can be used to avoid the CLI of neighboring cells.

In a second variation of the fifth embodiment, a dynamic TDD configuration can be applied to a whole cluster. In this embodiment, the dynamic TDD configuration can be used for the whole cluster and the joint scheduler can be used to schedule the F slots to avoid CLI. This process is designed for a cluster where different types of DL to UL traffic patterns are observed at different regions.

A semi-static TDD pattern with F slots can be assigned to each cell. The semi-static TDD pattern can be determined based on the common traffic pattern of the whole cluster. As an example, we assign the DDDSUUFFFF pattern to all the cells in the cluster. Then, based on the cells' traffic, the joint scheduler can be used to decide the F slots direction and resource allocation of each cell.

In an example process, first rank all the cells based on the priority (e.g. aggregate priority of the services of connected UEs) and/or load. Second, start with the cell with the highest rank. Schedule data on the fixed D and U slots. Decide the F slot's direction of this cell based on the traffic demand. If no data is to be scheduled for a F slot, it will be marked as E (empty) slot. Third, find the cell with the $2^{nd}$ highest rank, and schedule data on the fixed D and U slots. Then, decide the F slot direction of this cell based on the following step. If the F slot of this cell has a neighbor that has already been scheduled and is with a defined DL/UL direction, then this F slot has to follow its neighbor's UL/DL direction. If all its neighbors have only E or F on the same slot, then, DL or UL direction can be assigned to this slot based on the data requirement of this cell. If the F slot is with neighbors of different directions on this slot, then no data should be scheduled on this slot to avoid CLI. If no data is to be scheduled on a F slot (due to either lack of data or to avoid CLI), it will be marked as E slot. Fourth, use the same process in step 3 for cells in the $3^{rd}$, $4^{th}$, . . . rank, and till all the F slots are decided.

The joint scheduler can send the F slots and E slots info to each cell and inform the RAN resource allocator how to do the scheduling on each cell. The RAN resource allocator can assign the direction of the F slots to the UEs, allocate the resources, and follow the rules of the joint scheduler to not use the E slots. This process utilizes the dynamic TDD configuration feature of 5G. It first satisfies the cells with the highest priority and/or load to avoid congestion in those cells, thereby improving the overall system performance. The joint scheduler can be used to avoid the CLI of neighboring cells.

Figure 10:
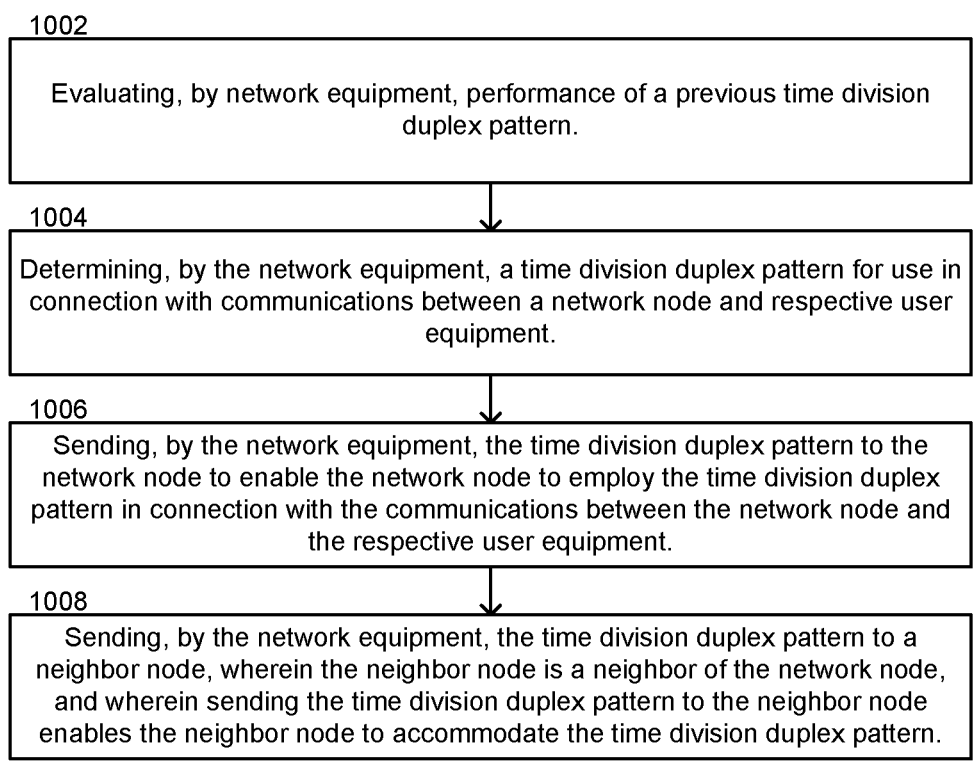
FIG. 10 is a flow diagram representing example operations of network equipment comprising a controller, in accordance with various aspects and embodiments of the subject disclosure.

FIG. 10 is a flow diagram representing example operations of network equipment comprising a controller, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 10 can be performed, for example, by network equipment comprising controller, such as the controller 420 illustrated in FIG. 4. Example operation 1002 comprises evaluating, by the network equipment 420, performance of a previous time division duplex (TDD) pattern. For example, a TDD pattern used for communications between gNB/RAN 430 and UE 440 can be evaluated. Evaluating the performance of the previous TDD pattern can comprise comparing a performance measurement, such as a KPI, to a target value for the performance measurement. A result of the evaluating can comprise a failure of the previous TDD pattern to attain the target performance.

In some embodiments, evaluating the performance of the previous TDD pattern can comprise comparing, by the network equipment 420, a previous number of downlink slots associated with the previous TDD pattern to a first number of downlink slots for a time division duplex pattern being determined by the controller 420. Similarly, a previous number of uplink slots associated with the previous TDD pattern can be compared to a second number of uplink slots for the TDD pattern being determined by the controller 420. In some embodiments, evaluating the performance of the previous TDD pattern can comprise comparing a packet delay associated with the previous TDD pattern to a packet delay budget value.

Example operation 1004 comprises determining, by the network equipment 420, a TDD pattern for use in connection with communications between a network node 430 and respective user equipment 440. Determining the TDD pattern at operation 1004 can be in response to the failure of the previous TDD pattern pursuant to operation 1002. Determining the TDD pattern can comprise, inter alia, determining, by the network equipment 420, a downlink data channel demand. Determining the downlink data channel demand can comprise determining the downlink data channel demand based on at least one of a downlink data channel condition, a number of multi input multi output layers, or an amount of downlink traffic requested by the respective user equipment.

Determining the time division duplex pattern at operation 1004 can comprise determining, based on the downlink data channel demand, an uplink data channel demand, a downlink control channel demand, and an uplink control channel demand, a first number of downlink slots for the TDD pattern and a second number of uplink slots for the TDD pattern.

Example operation 1006 comprises sending, by the network equipment 420, the TDD pattern to the network node 430 to enable the network node 430 to employ the TDD pattern in connection with the communications between the network node 430 and the respective user equipment 440. Example operation 1008 can optionally be performed in addition to operation 1006. Example operation 1008 comprises sending, by the network equipment 420, the TDD pattern to a neighbor node, wherein the neighbor node is a neighbor of the network node 430, and wherein sending the TDD pattern to the neighbor node enables the neighbor node to accommodate the TDD pattern. The TDD pattern can be accommodated for example by adapting a neighbor node TDD pattern so as to avoid CLI with the TDD pattern.

Figure 11:
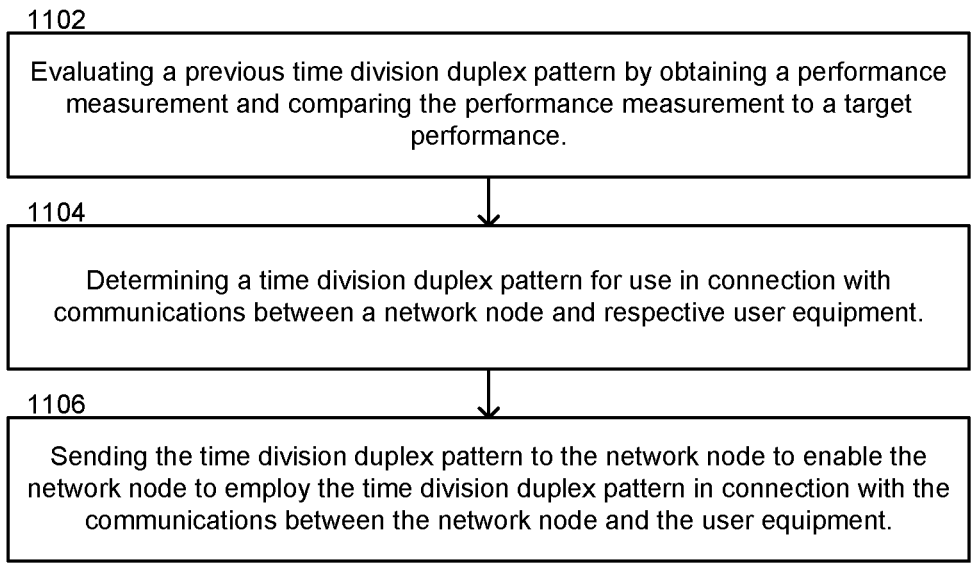
FIG. 11 is a flow diagram representing another set of example operations of network equipment comprising a controller, in accordance with various aspects and embodiments of the subject disclosure.

FIG. 11 is a flow diagram representing another set of example operations of network equipment comprising a controller, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 11 can be performed, for example, by network equipment comprising controller, such as the controller 420 illustrated in FIG. 4. Example operation 1102 comprises evaluating a previous time division duplex pattern by obtaining a performance measurement and comparing the performance measurement to a target performance. Operations 1104-1106 can optionally be performed in response to a failure of the previous time division duplex pattern to meet the target performance.

Example operation 1104 comprises determining a TDD pattern for use in connection with communications between a network node 430 and respective user equipment 440. In some embodiments, operation 1104 can determining the TDD pattern for use in a cluster of geographically proximal network nodes, including the network node 430 as well as other network nodes.

Example operation 1104 can comprise determining a downlink data channel demand. The downlink data channel demand can be based on an amount of downlink traffic requested by the respective user equipment 440, and/or based on at least one of a downlink data channel condition or a number of multi input multi output (MIMO) layers.

Determining the TDD pattern at operation 1104 can comprise determining, based on the downlink data channel demand, a priority of the downlink data channel demand, an uplink data channel demand, a priority of the uplink data channel demand, a downlink control channel demand, and an uplink control channel demand, a first number of downlink slots for the TDD pattern and a second number of uplink slots for the TDD pattern. The priority of the downlink data channel demand can comprise, e.g., an aggregate quality of service level of downlink data traffic, and the priority of the uplink data channel demand can comprise an aggregate quality of service level of uplink data traffic.

Example operation 1108 comprises sending the TDD pattern to the network node 430 (or cluster) to enable the network node 430 to employ the TDD pattern in connection with the communications between the network node 430 and the user equipment 440.

Figure 12:
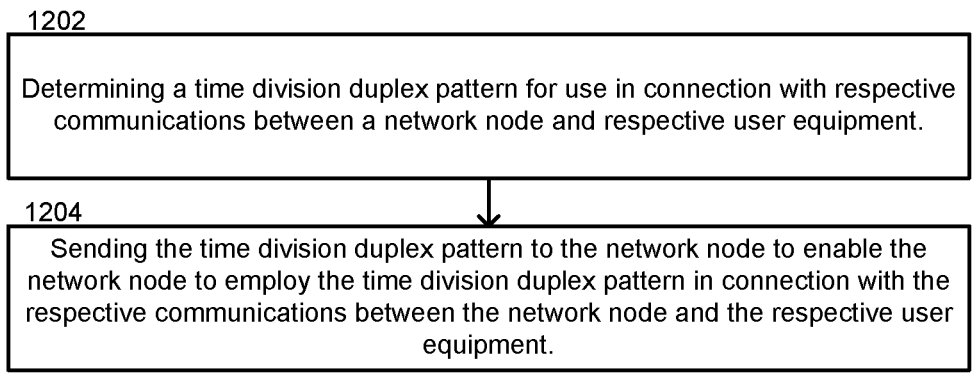
FIG. 12 is a flow diagram representing another set of example operations of network equipment comprising a controller, in accordance with various aspects and embodiments of the subject disclosure.

FIG. 12 is a flow diagram representing another set of example operations of network equipment comprising a controller, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 12 can be performed, for example, by network equipment comprising controller, such as the controller 420 illustrated in FIG. 4. Example operation 1202 comprises determining a TDD pattern for use in connection with respective communications between a network node 430 and respective user equipment 440. Determining the TDD pattern can be in response to evaluating performance of a previous TDD pattern, and wherein a result of the evaluating comprises a failure of the previous TDD pattern to reach a target performance. Evaluating the performance of the previous TDD pattern can comprise comparing a previous time offset associated with the previous TDD pattern to a different time offset allowed for the TDD pattern.

Determining the TDD pattern can comprise determining a first number of downlink slots for the TDD pattern, a second number of uplink slots for the TDD pattern, and a sequence including the first number of downlink slots and the second number of uplink slots. The first number and the second number can be determined based, e.g., on a downlink data channel demand, an uplink data channel demand, a downlink control channel demand, and an uplink control chancel demand. The downlink data channel demand can be determined based on a downlink data channel condition, a number of multi input multi output layers, and amount of downlink traffic requested by the UE 440.

The sequence can be determined using a time offset associated with the sequence. For example, the sequence can be determined using the time offset by comparing the time offset to a different time offset allowed for the TDD pattern.

Example operation 1204 comprises sending the TDD pattern to the network node 430 to enable the network node 430 to employ the TDD pattern in connection with the respective communications between the network node 430 and the respective user equipment 440.

Figure 13:
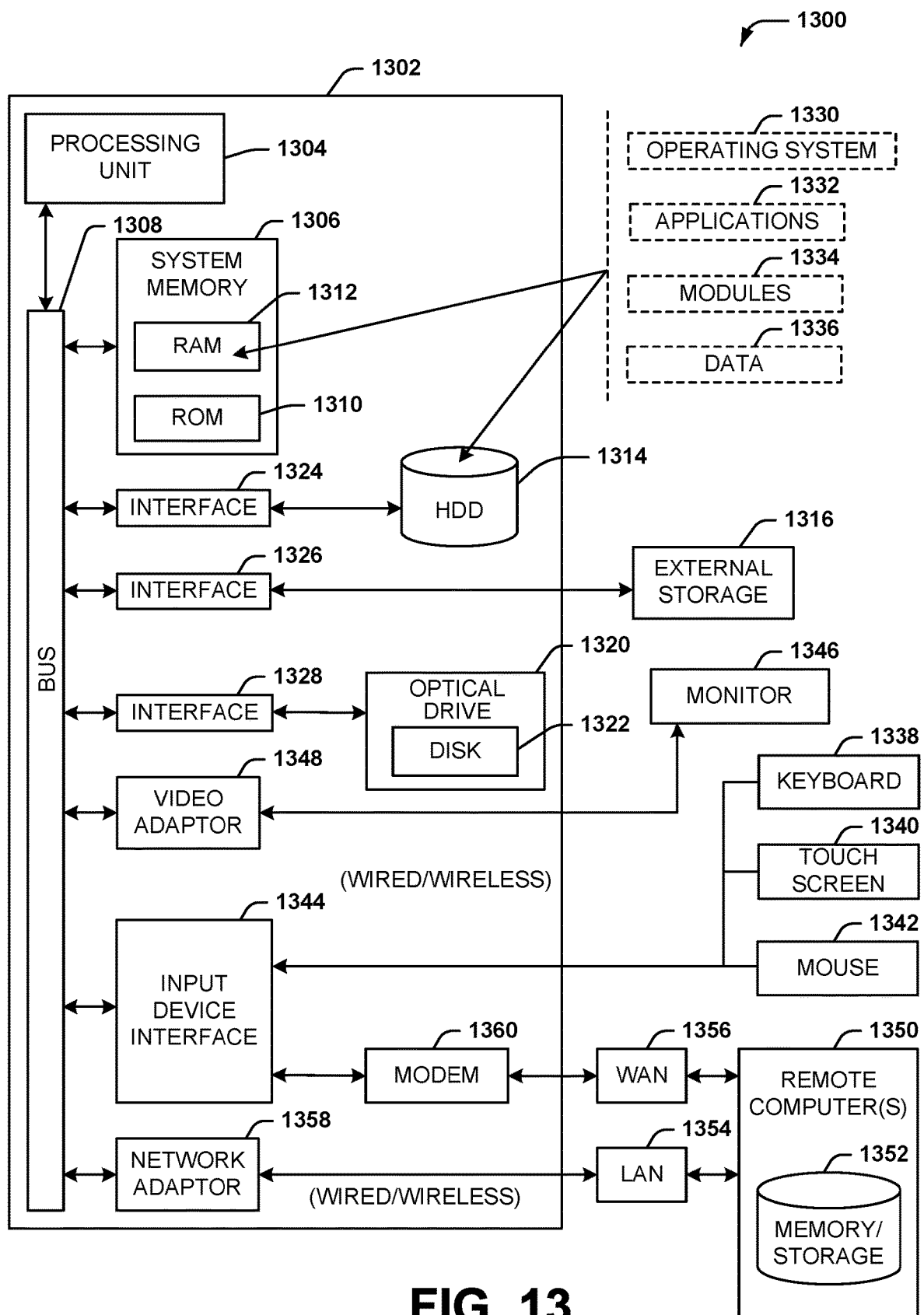
FIG. 13 is a block diagram of an example computer that can be operable to execute processes and methods in accordance with various aspects and embodiments of the subject disclosure.

FIG. 13 is a block diagram of an example computer that can be operable to execute processes and methods in accordance with various aspects and embodiments of the subject disclosure. The example computer can be adapted to implement, for example, any of the various network equipment described herein.

FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), smart card, flash memory (e.g., card, stick, key drive) or other memory technology, compact disk (CD), compact disk read only memory (CD-ROM), digital versatile disk (DVD), Blu-Ray™ disc (BD) or other optical disk storage, floppy disk storage, hard disk storage, magnetic cassettes, magnetic strip(s), magnetic tape, magnetic disk storage or other magnetic storage devices, solid state drives or other solid state storage devices, a virtual device that emulates a storage device (e.g., any storage device listed herein), or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid-state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    determining, by network equipment comprising a processor, a time division duplex pattern for use in a cell in connection with communications between a network node of the cell and a group of user equipment operating in the cell, wherein determining the time division duplex pattern comprises determining a first number of downlink slots for the time division duplex pattern and a second number of uplink slots for the time division duplex pattern based on a downlink data channel demand, an uplink data channel demand, and a control channel demand, wherein the control channel demand indicates a total amount of control channel data to be transmitted on one or more control channels of the cell, and wherein the total amount of control channel data to be transmitted is determined based on a total amount of downlink data requested to be transmitted from the network node on one or more downlink channels of the cell to the group of user equipment indicated in the downlink data channel demand, and a total amount of uplink data requested to be transmitted to the network node on one or more uplink channels of the cell by the group of user equipment indicated in the uplink data channel demand; and
    sending, by the network equipment, the time division duplex pattern to the network node to enable the network node to employ the time division duplex pattern in connection with the communications between the network node and the group of user equipment.

2. The method of claim 1, further comprising determining, by the network equipment, the downlink data channel demand based on at least one of a downlink data channel condition of the one or more downlink channels, a quantity of multi input multi output layers of the one or more downlink channels, or the total amount of downlink data requested to be transmitted.

3. The method of claim 1, wherein determining the time division duplex pattern comprises determining the time division duplex pattern in response to evaluating, by the network equipment, performance of a previous time division duplex pattern used in the cell, wherein a result of the evaluating comprises a failure of the previous time division duplex pattern to attain a target performance.

4. The method of claim 3, wherein evaluating the performance of the previous time division duplex pattern comprises comparing a performance measurement of the cell to a target value for the performance measurement.

5. The method of claim 3, wherein evaluating the performance of the previous time division duplex pattern comprises:
    comparing, by the network equipment, a previous number of downlink slots associated with the previous time division duplex pattern to the first number, and
    comparing a previous number of uplink slots associated with the previous time division duplex pattern to the second number.

6. The method of claim 3, wherein evaluating the performance of the previous time division duplex pattern comprises comparing a packet delay associated with the previous time division duplex pattern to a packet delay budget value.

7. The method of claim 1, wherein the cell is a first cell, and further comprising sending, by the network equipment, the time division duplex pattern to a neighbor node in a second cell, wherein the neighbor node is a neighbor of the network node, and wherein sending the time division duplex pattern to the neighbor node enables the neighbor node to accommodate the time division duplex pattern.

8. Network equipment, comprising:
    a processor; and
    a memory that stores executable instructions that, when executed by the processor, facilitate performance of operations, comprising:
        determining a time division duplex pattern for use in a cell in connection with communications between a network node of the cell and a group of user equipment operating in the cell, wherein determining the time division duplex pattern comprises determining a first number of downlink slots for the time division duplex pattern and a second number of uplink slots for the time division duplex pattern based on a downlink data channel demand, a priority of the downlink data channel demand, an uplink data channel demand, a priority of the uplink data channel demand, wherein, and control channel demand, indicates a total amount of control channel data to be transmitted on one or more control channels of the cell, and wherein the total amount of control channel data to be transmitted is determined based on a total amount of downlink data requested to be transmitted from the network node on one or more downlink channels of the cell to the group of user equipment indicated in the downlink data channel demand, and a total amount of uplink data requested to be transmitted to the network node on one or more uplink channels of the cell by the group of user equipment indicated in the uplink data channel demand; and
        sending the time division duplex pattern to the network node to enable the network node to employ the time division duplex pattern in connection with the communications between the network node and the group of user equipment.

9. The network equipment of claim 8, wherein the priority of the downlink data channel demand comprises an aggregate quality of service level of the total amount of downlink data, and wherein the priority of the uplink data channel demand comprises an aggregate quality of service level of the total amount of uplink data.

10. The network equipment of claim 8, wherein the operations further comprise determining the downlink data channel demand based on the total amount of downlink traffic requested to be transmitted.

11. The network equipment of claim 10, wherein the operations further comprise determining the downlink data channel demand based further on at least one of a downlink data channel condition of the one or more downlink channels or a quantity of multi input multi output layers of the one or more downlink channels.

12. The network equipment of claim 8, wherein determining the time division duplex pattern is in response to a failure of a previous time division duplex pattern used in the cell to meet a target performance.

13. The network equipment of claim 12, wherein the operations further comprise;
    evaluating the previous time division duplex pattern by obtaining a performance measurement of the cell; and
    comparing the performance measurement to the target performance.

14. The network equipment of claim 8, wherein the cell is a first cell, and wherein the operations further comprise:
    sending the time division duplex pattern to a neighbor node in a second cell, wherein the neighbor node is a neighbor of the network node, and wherein sending the time division duplex pattern to the neighbor node enables the neighbor node to accommodate the time division duplex pattern.

15. A non-transitory machine-readable medium, comprising executable instructions that, when executed by a processor, facilitate performance of operations, comprising:
  determining a time division duplex pattern for use in a cell in connection with respective communications between a network node of the cell and a group of user equipment operating in the cell, wherein determining the time division duplex pattern comprises determining a first number of downlink slots for the time division duplex pattern, a second number of uplink slots for the time division duplex pattern, and a sequence including the first number of downlink slots and the second number of uplink slots,
    wherein the first number and the second number are determined based on a downlink data channel demand, an uplink data channel demand, and a control channel demand, wherein the control channel demand indicates a total amount of control channel data to be transmitted on one or more control channels of the cell, and wherein the total amount of control channel data to be transmitted is determined based on a total amount of downlink data requested to be transmitted from the network node on one or more downlink channels of the cell to the group of user equipment indicated in the downlink data channel demand, and a total amount of uplink data requested to be transmitted to the network node on one or more uplink channels of the cell by the group of user equipment indicated in the uplink data channel demand, and
    wherein the sequence is determined using a time offset associated with the sequence; and
  sending the time division duplex pattern to the network node to enable the network node to employ the time division duplex pattern in connection with the respective communications between the network node and the respective user equipment.

16. The non-transitory machine-readable medium of claim 15, wherein the sequence is determined using the time offset by comparing the time offset to a maximum time offset allowed for the time division duplex pattern.

17. The non-transitory machine-readable medium of claim 15, wherein determining the time division duplex pattern is in response to evaluating performance of a previous time division duplex pattern used in the cell, and wherein a result of the evaluating comprises a failure of the previous time division duplex pattern to reach a target performance.

18. The non-transitory machine-readable medium of claim 17, wherein evaluating the performance of the previous time division duplex pattern comprises comparing a previous time offset associated with the previous time division duplex pattern to a maximum time offset allowed for the previous time division duplex pattern.

19. The non-transitory machine-readable medium of claim 15, wherein the downlink data channel demand is determined based on at least one of a downlink data channel condition of the one or more downlink channels, a quantity of multi input multi output layers of the one or more downlink channels, or the total amount of downlink data requested to be transmitted.

20. The non-transitory machine-readable medium of claim 15, wherein the cell is a first cell, and wherein the operations further comprise:
  sending the time division duplex pattern to a neighbor node in a second cell, wherein the neighbor node is a neighbor of the network node, and wherein sending the time division duplex pattern to the neighbor node enables the neighbor node to accommodate the time division duplex pattern.

* * * * *